(12) United States Patent
You et al.

(10) Patent No.: US 12,086,406 B2
(45) Date of Patent: Sep. 10, 2024

(54) CONTROL METHOD AND DEVICE AND ELECTRONIC DEVICE

(71) Applicant: Lenovo (Beijing) Limited, Beijing (CN)

(72) Inventors: Yakun You, Beijing (CN); Ke Wang, Beijing (CN); Xue Chen, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 17/691,114

(22) Filed: Mar. 9, 2022

(65) Prior Publication Data

US 2023/0099124 A1 Mar. 30, 2023

(30) Foreign Application Priority Data

Sep. 28, 2021 (CN) .......................... 202111145053.9

(51) Int. Cl.
*G06F 3/048* (2013.01)
*G06F 3/04842* (2022.01)
*G06F 3/04883* (2022.01)
*G06F 3/04886* (2022.01)

(52) U.S. Cl.
CPC ...... *G06F 3/04886* (2013.01); *G06F 3/04842* (2013.01); *G06F 3/04883* (2013.01)

(58) Field of Classification Search
CPC ............. G06F 3/04886; G06F 3/04842; G06F 3/04883
See application file for complete search history.

(56) References Cited

U.S. PATENT DOCUMENTS

| | | | | |
|---|---|---|---|---|
| 9,208,477 | B2* | 12/2015 | Webber | G06Q 10/107 |
| 9,244,544 | B2* | 1/2016 | Matsuki | G06F 3/03547 |
| 2011/0216075 | A1* | 9/2011 | Shigeta | G06F 3/048 |
| | | | | 345/473 |
| 2013/0006957 | A1* | 1/2013 | Huang | G06F 3/04883 |
| | | | | 707/706 |
| 2017/0242550 | A1* | 8/2017 | Shibata | G06F 3/0233 |
| 2017/0336969 | A1* | 11/2017 | Bi | G06F 40/274 |
| 2019/0056863 | A1* | 2/2019 | Jones | G06F 3/03547 |
| 2021/0303147 | A1* | 9/2021 | Guerrero | G06F 3/04886 |
| 2022/0318036 | A1* | 10/2022 | Zhang | G06F 3/04817 |
| 2023/0359351 | A1* | 11/2023 | Liu | G06F 3/04886 |

* cited by examiner

*Primary Examiner* — Mahelet Shiberou
(74) *Attorney, Agent, or Firm* — ANOVA LAW GROUP, PLLC (57) ABSTRACT

A control method. The control method includes controlling a first display area of an electronic device to display a display interface of a first object; controlling the electronic device to enter a first state or a second state in response to a first trigger event; in the first state, performing an operation associated with the first object in response to a first operation on the display interface of the first object; and in the second state, performing an operation associated with a second object in response to a second operation on the display interface of the first object.

19 Claims, 10 Drawing Sheets

CONTROL METHOD AND DEVICE AND ELECTRONIC DEVICE

CROSS-REFERENCES TO RELATED APPLICATION

This application claims priority to Chinese Patent Application No. 202111145053.9 filed on Sep. 28, 2021, the entire content of which is incorporated herein by reference.

FIELD OF TECHNOLOGY

The present disclosure relates to the field of computer technology and, more specifically, to a control method and device, and an electronic device.

BACKGROUND

With the development of electronic technology, more and more electronic devices are being used in daily lives. However, the operational convenience of electronic devices still needs to be improved.

BRIEF SUMMARY OF THE DISCLOSURE

One aspect of the present disclosure provides a control method. The control method includes controlling a first display area of an electronic device to display a display interface of a first object; controlling the electronic device to enter a first state or a second state in response to a first trigger event; in the first state, performing an operation associated with the first object in response to a first operation on the display interface of the first object; and in the second state, performing an operation associated with a second object in response to a second operation on the display interface of the first object.

Another aspect of the present disclosure provides a control device. The control device includes a first control module, a second control module, a first execution module, and a second execution module. The first control module is configured to control a first display area of an electronic device to display a display interface of a first object, the second control module is configured to control the electronic device to enter a first state or a second state in response to a first trigger event, the first execution module is configured to perform an operation associated with the first object in response to a first operation on the display interface of the first object in the first state, and the second execution module is configured to perform an operation associated with a second object in response to a second operation on the display interface of the first object.

Another aspect of the present disclosure provides an electronic device. The electronic device includes a processor and a memory. The memory stores program instructions that, when being executed by the processor, cause the processor to control a first display area of the electronic device to display a display interface of a first object; control the electronic device to enter a first state or a second state in response to a first trigger event; in the first state, perform an operation associated with the first object in response to a first operation on the display interface of the first object; and in the second state, perform an operation associated with a second object in response to a second operation on the display interface of the first object.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In order to make the objects, features and advantages of the present disclosure clearer, the present disclosure will be described in further detail below in conjunction with the accompanying drawings and specific embodiments.

Figure 1:
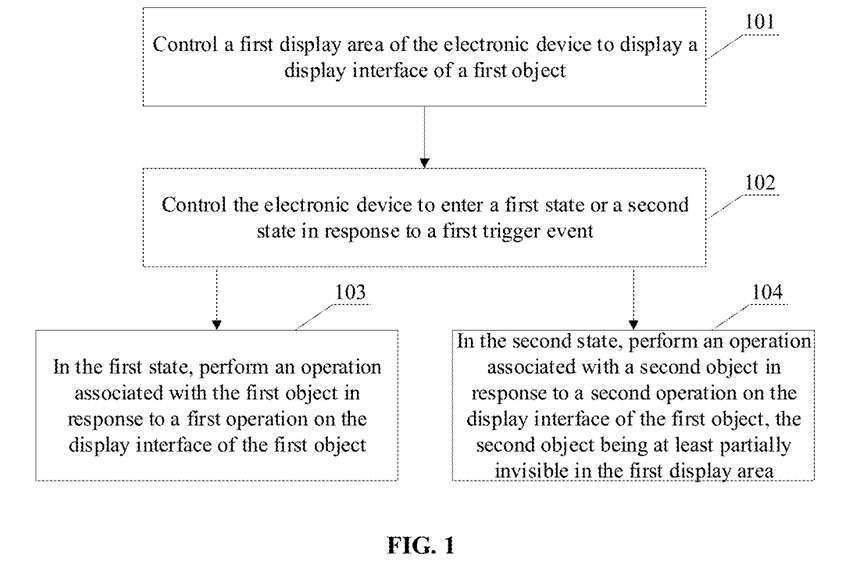
FIG. 1 is a flowchart of a control method according to an embodiment of the present disclosure.

FIG. 1 is a flowchart of a control method according to an embodiment of the present disclosure. The method can be applied to electronic devices, and the present disclosure does not limit the types of the electronic devices. The method will be described in detail below.

101, controlling a first display area of the electronic device to display a display interface of a first object.

In some embodiments, the first object may be, but is not limited to, an application in the electronic device, such as a browser or a social application (e.g., WeChat).

In the embodiments of the present disclosure, based on an operation of activating the display interface of the first object, a first display area that can correspond to the display interface of the first object may be determined, and the display interface of the first object may be displayed in the first display area. For example, based on an input operation acting on an icon of the first object in the task bar of the electronic device, a first display area corresponding to the thumbnail of the first object may be determined, and the thumbnail of the first object may be displayed in the first display area. Or, based on the input operation acting on an icon of the first object in the desktop of the electronic device or the input operation acting on the thumbnail of the first object in the electronic device, a first display area corresponding to a window interface of the first object may be determined, and the window interface of the first object may be displayed in the first display area. In some embodiments, the display size of the window interface of the first object may be at least larger than the display size of the thumbnail of the first object.

Of course, the determination of the first display area of the electronic device is not limited to the above examples. In the embodiments of the present disclosure, the entire screen of the electronic device may also be used as the first display area to display the display interface of the first object.

102, controlling the electronic device to enter a first state or a second state in response to a first trigger event.

In some embodiments, the working state indicated by the first trigger event may be determined in response to the first trigger event. If the working state indicated by the first trigger event is the first state, the electronic device may be controlled to enter the first state. If the working state indicated by the first trigger event is the second state, the electronic device may be controlled to enter the second state.

In some embodiments, the control operation performed by the electronic device in the first state may be different from the control operation performed by the electronic device in the second state.

103, in the first state, performing an operation associated with the first object in response to a first operation on the display interface of the first object.

In some embodiments, in the first state, the electronic device may not restrict operations on the display interface of the first object, and may perform operations associated with the first object in response to the first operation on the display interface of the first object.

In some embodiments, in the first state, performing an operation associated with the first object in response to the first operation on the display interface of the first object may include, in the first state, performing an operation associated with the display interface of the first object in response to the first operation on the display interface of the first object. For example, in the first state, in response to a zoom-in operation on the display interface of the first object, the display interface of the first object may be enlarged. Or, in the first state, in response to a zoom-out operation on the display interface of the first object, the display interface of the first object may be reduced.

Of course, in the first state, performing an operation associated with the first object in response to the first operation on the display interface of the first object may also include, in the first state, performing an operation associated with a function module of the first object in response to the first operation on the display interface of the first object. For example, in the first state, in response to the triggering operation of the search control in the display interface of a music application, the search page of the music application may be directly entered.

104, in the second state, performing an operation associated with a second object in response to a second operation on the display interface of the first object, the second object being at least partially invisible in the first display area.

In the embodiments of the present disclosure, the second operation on the display interface of the first object may be the same as or different from the first operation on the display interface of the first object. It should be noted that, when the second operation on the display interface of the first object is the same as the first operation on the display interface of the first object, the control operation performed by the electronic device in response to the second operation on the display interface of the first object in the second state may be the different from the control operation performed by the electronic device in response to the first operation on the display interface of the first object in the first state.

In some embodiments, in the second state, an operation associated with the second object different from the first object may be performed in response to the second operation on the display interface of the first object.

In some embodiments, performing an operation associated with the second object different from the first object may include, but is not limited to, performing an operation associated with a display interface of the second object different from the first object; or, performing an operation associated with a functional module of the second object different from the first object.

It should be noted that the second object may, but is not limited to, accept an operation in a first virtual area. Correspondingly, the electronic device may perform an operation associated with the second object in the first virtual area in response to the second operation on the display interface of the first object, and the first virtual area may at least overlap the display interface of the first object.

Of course, the virtual area may not be set for the second object, and the operation associated with the second object may only be performed in the background.

Consistent with the present disclosure, on the basis of controlling the first display area of the electronic device to display the display interface of the first object, in response to the first trigger event, the electronic device can be controlled to enter the first state or the second state. In the first state, an operation associated with the first object can be performed in response to a first operation on the display interface of the first object, and in the second state, an operation associated with the second operation can be performed in response to a second operation on the display interface of the first object. In this way, the electronic device can perform operations associated with different objects in response to operations on the display interface of the same object in different states, thereby improving the operational convenience of the electronic device and user interaction experience.

In addition, in the second state, an operation associated with the second object can be performed in response to a second operation on the display interface of the first object, the second object being at least invisible in the first display area. In this way, the influence of the display effect of the display interface of the first object in the first display area can be reduced while performing the operation associated with the second object.

Figure 2:
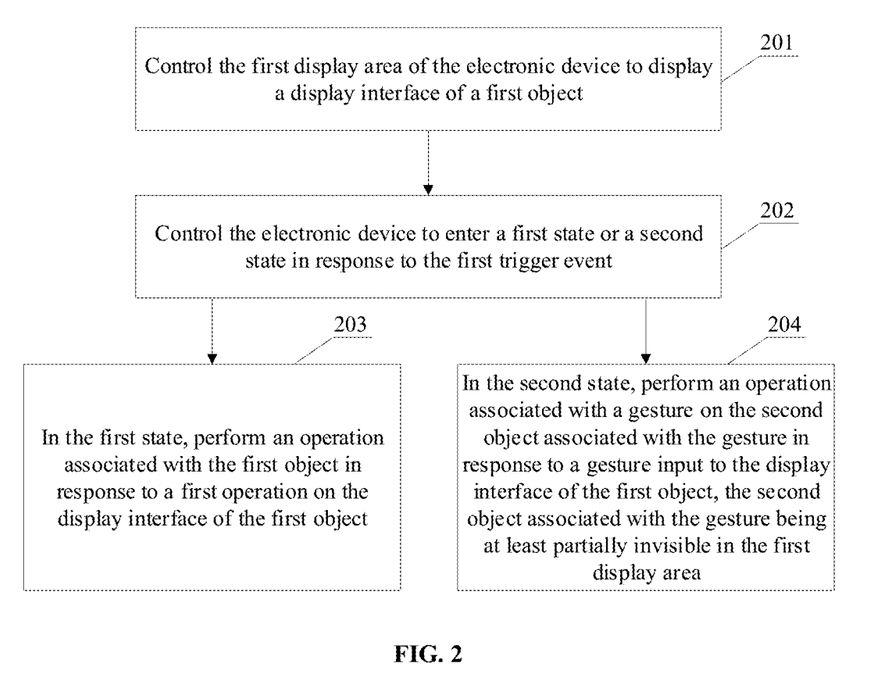
FIG. 2 is a flowchart of the control method according to an embodiment of the present disclosure.

FIG. 2 is a flowchart of the control method according to an embodiment of the present disclosure. This embodiment is mainly a refinement of the control method described above. The method will be described in detail below.

201, controlling the first display area of the electronic device to display a display interface of a first object.

202, controlling the electronic device to enter a first state or a second state in response to the first trigger event.

203, in the first state, performing an operation associated with the first object in response to a first operation on the display interface of the first object.

For details of the processes of 201 to 203, reference can be made to the relevant descriptions of the processes of 101 to 103, which will not be repeated here.

204, in the second state, performing an operation associated with a gesture on the second object associated with the gesture in response to a gesture input to the display interface of the first object, the second object associated with the gesture being at least partially invisible in the first display area.

In some embodiments, the electronic device may pre-establish an association relationship between the input gesture corresponding to the second state of the electronic device and the second object, and an association relationship between the input gesture associated with the second object and the control operation on the function module of the second object.

In some embodiments, if the gesture input to the display interface of the first object is obtained in the second state, in response to the gesture input to the display interface of the first object, the function module of the second object associated with the gesture may be controlled based on the pre-established association relationship between the input gesture corresponding to the second state of the electronic device and the second object, and the association relationship between the input gesture associated with the second object and the control operation of the function module of the second object. For example, as shown in part (a) of FIG. 3, in the second state, an input gesture "O" can be made to the display interface of a browser (i.e., one of the examples of the first object) page in the first display area of the electronic device. Correspondingly, the electronic device can respond to the "O" gesture and enter the search page of Kuwo Music (for example, www.kuwo.cn) based on the pre-established association relationship between the "O" gesture corresponding to the second state of the electronic device and Kuwo Music, and the association relationship between the "O" gesture and the search page. In some embodiments, as shown in part (b) of FIG. 3, the entire search page of Kuwo Music can be displayed in the first display area, or, as shown in part (c) of FIG. 3, part of the search page of Kuwo Music can be displayed in the first display area.

Figure 3:
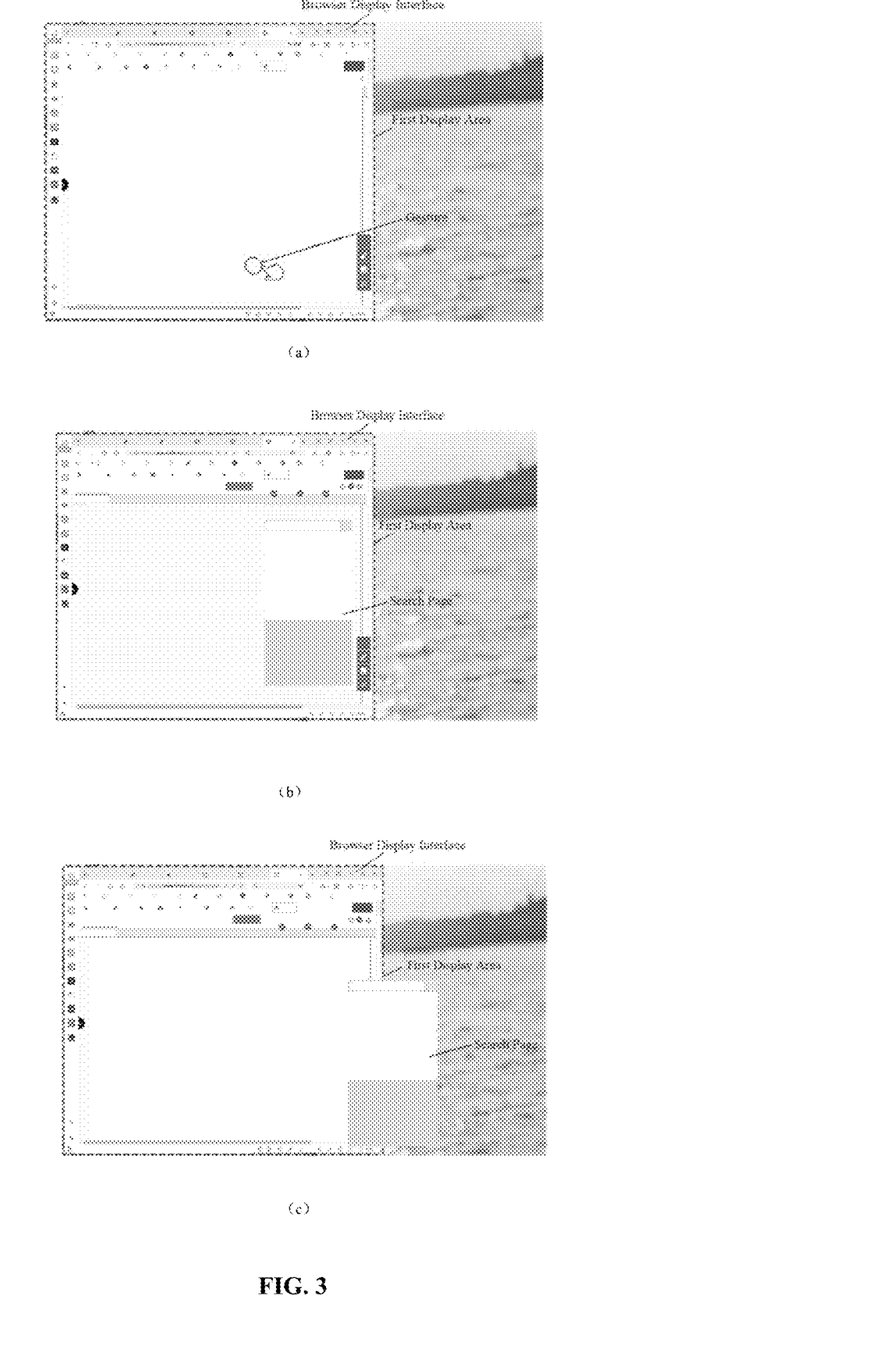
FIG. 3 is a schematic diagram of an implementation scenario of the control method according to an embodiment of the present disclosure.

It should be noted that FIG. 3 is an example, which is not a limitation on the process at 204.

In addition, performing an operation associated with the gesture on the second object associated with the gesture in response to the gesture input on the display interface of the first object in the second state may include, in a pre-configured second state, when the gesture input to the display interface of the first object is used for input, in the second state, in response to the gesture input to the display interface of the first object, identifying the gesture to obtain a character, and input the character in the display interface of the second object associated with the gesture. In some embodiments, the at least part of the display interface of the second object associated with the gesture may be invisible in the first display area.

It should be understood that in the scenario of controlling the function module of the second object associated with the gesture of the scenario of inputting characters in the display interface of the second object associated with the gesture, the virtual area may not be set for the second object, and the function module of the second object may only be controlled in the background or the character may be obtained by identifying the gesture in the background.

The process at 204 can be a specific implementation of the process at 104.

Consistent with the present disclosure, in the second state, in response to a gesture input to the display interface of the first object, an operation associated with the gesture can be performed on the second object associated with the gesture, which ensures that the gesture associated with the second object can be input without switching the input interface. Further, in response to the gesture input on the display interface of the first object, the electronic device can perform an operation associated with the gesture on the second object associated with the gesture, thereby improving the operational convenience of the electronic device and the user interaction experience.

In addition, in the second state, in response to a gesture input to the display interface of the first object, an operation associated with the gesture can be performed on the second object associated with the gesture. At least part of the second object associated with the gesture may be invisible in the first display area. In this way, the influence of the display effect of the display interface of the first object in the first display area can be reduced while performing the operation associated with the gesture on the second object associated with the gesture.

Figure 4:
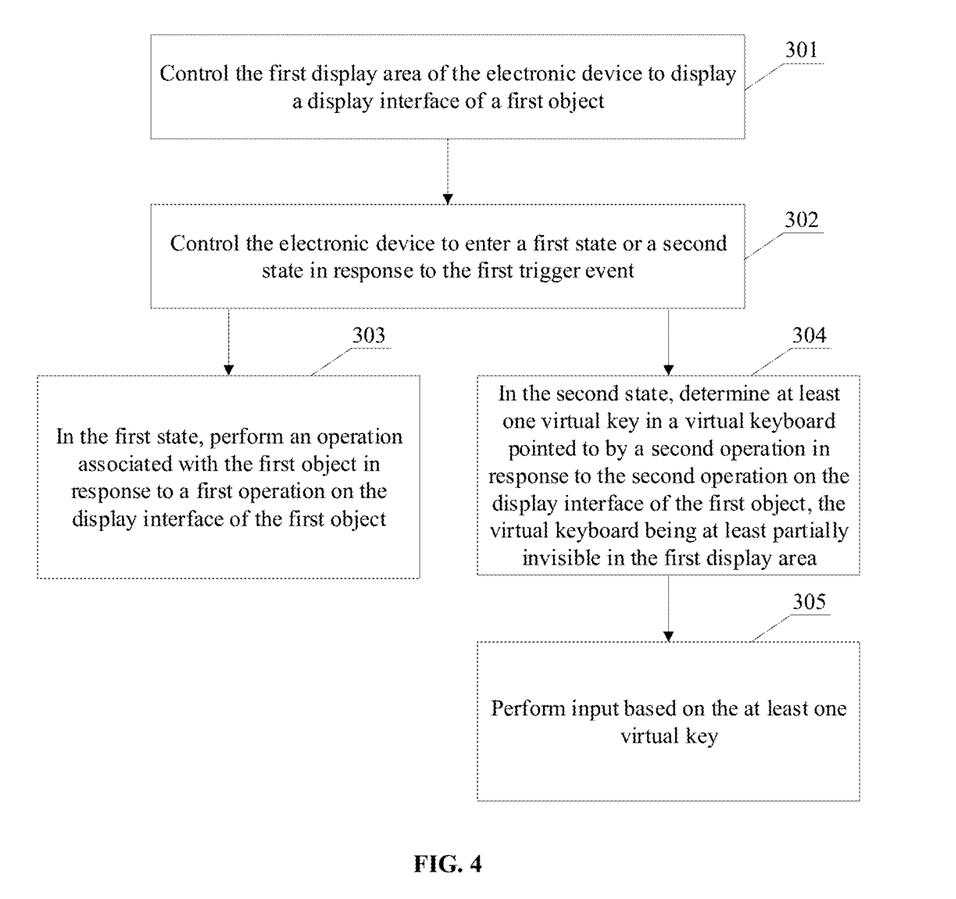
FIG. 4 is a flowchart of the control method according to an embodiment of the present disclosure.

FIG. 4 is a flowchart of the control method according to an embodiment of the present disclosure. This embodiment is mainly a refinement of the control method described above. The method will be described in detail below.

301, controlling the first display area of the electronic device to display a display interface of a first object.

302, controlling the electronic device to enter a first state or a second state in response to the first trigger event.

303, in the first state, performing an operation associated with the first object in response to a first operation on the display interface of the first object.

For details of the processes of 301 to 303, reference can be made to the relevant descriptions of the processes of 101 to 103, which will not be repeated here.

304, in the second state, determining at least one virtual key in the virtual keyboard pointed to by a second operation in response to the second operation on the display interface of the first object, the virtual keyboard being at least partially invisible in the first display area.

In some embodiments, in the second state, if a third object of the electronic device needs to respond to a keyboard input operation, a second operation may be performed on the display interface of the first object. The third object may be one of the applications in the electronic device that is different from the first object and the second object.

In some embodiments, in the second state, the second operation on the display interface of the first object may be pre-configured to only activate the virtual keyboard and perform operations associated with the virtual keyboard.

Of course, the second state may also be pre-configured that the second operation on the display interface of the first object may activate the virtual keyboard, perform operations associated with the virtual keyboard, activate the second object other than the virtual keyboard, and perform operations not limited to those associated with the second object other than the virtual keyboard.

In the case where the virtual keyboard can be activated, the operations associated with the virtual keyboard can be performed, the second object other than the virtual keyboard can be activated, and the operations not limited to those associated with the second object other than the virtual keyboard can be performed, different second operations may be set corresponding to the virtual keyboard and the second object other than the virtual keyboard. Further, the association relationship between the virtual keyboard and the corresponding second operation, and the association relationship between the second object other than the virtual keyboard and the corresponding second operation may be pre-established, which can be used to accurately activate the virtual keyboard or the second object other than the virtual keyboard.

Correspondingly, determining at least one virtual key in the virtual keyboard pointed to by the second operation in response to the second operation on the display interface of the first object may include in response to the second operation on the display interface of the first object, based on the pre-established association relationship, determine that the second operation correspond to the virtual keyboard, and determine at least one virtual key in the virtual keyboard pointed to by the second operation.

In some embodiments, the timing of activating and executing the operation associated with the virtual keyboard may be in response to the second operation on the display interface of the first object, and the timing of activating the virtual keyboard may be in response to the second operation on the display interface of the first object or the electronic device entering the second state.

In the embodiments of the present disclosure, the second operation may include, but is not limited to, a touch operation or a mouse click operation.

It should be understood that the virtual keyboard may, but is not limited to, accept operations in a first virtual area. Correspondingly, the electronic device may, in response to the second operation on the display interface of the first object, determine at least one virtual key in the virtual keyboard pointed to by the second operation in the first virtual area, and the first virtual area may at least overlap the display area of the first object.

305, performing input based on at least one virtual key.

In some embodiments, performing input based on at least one virtual key may include, but is not limited to, performing input in a second display area of the electronic device based on at least one virtual key.

In some embodiments, the second display area may be the same as the first display area, or the second display area may be a different area from the first display area.

More specifically, when the electronic device includes a first screen and a second screen, and the first display area is located in the first screen, performing input in the second display area of the electronic device based on at least one virtual key may include the following process.

3051, moving the input interface of the third object of the electronic device to the second display area on the second screen of the electronic device, and performing input in the second display area based on the at least one virtual key.

Figure 5:
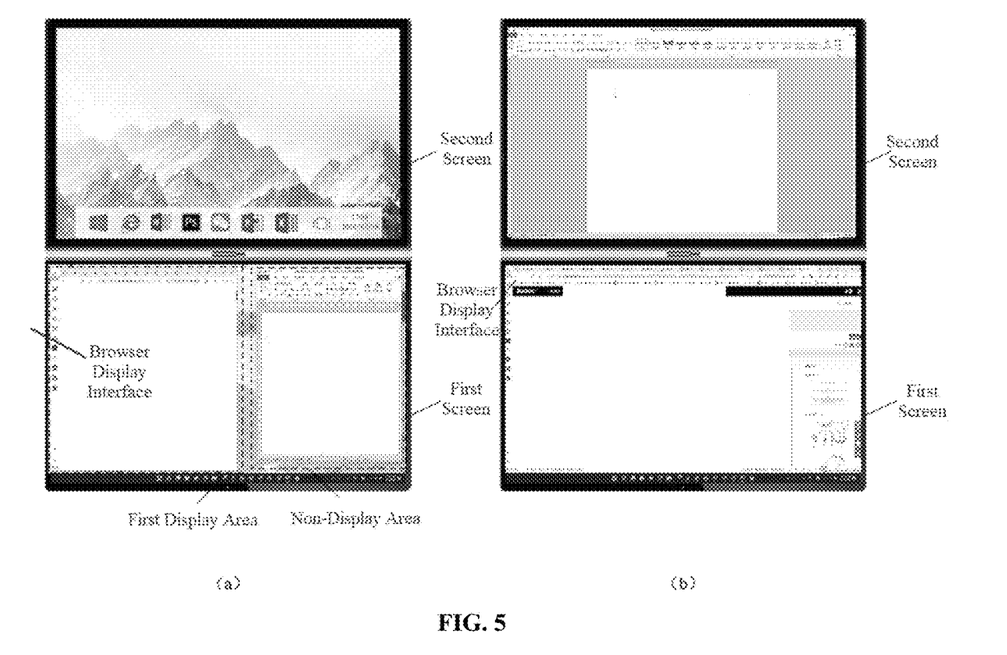
FIG. 5 is a schematic diagram of an implementation scenario of the control method according to an embodiment of the present disclosure.

In some embodiments, the display interface of the third object of the electronic device may be moved to the second display area on the second screen of the electronic device, thereby realizing the split-screen display of the display interface of the first object and the input interface of the third object of the electronic device. In this way, the display effect of the display interface of the first object can be ensured, and a maximized input interface can also be provided to the user. For example, as shown in part (a) of FIG. 5, the display interface of the browser (i.e., one of the examples of the first object) is displayed in the first display area of the first screen and the input interface of Word (i.e., one of the examples of the third object) is displayed in a display area of the first screen other than the first display area. As shown in part (b) of FIG. 5, the Word input interface is moved to the second display area on the second screen of the electronic device. When the Word input interface is moved to the second display area on the second screen of the electronic device, input can be performed in the second display area based on at least one virtual key.

Consistent with the present disclosure, in the second state, in response to a second operation input on the display interface of the first object, at least one virtual key in the virtual keyboard pointed to by the second operation can be determined, and input can be performed based on the at least one virtual key. In this way, input can be performed without switching interface, which improves the input convenience of the electronic device, thereby improving the user interaction experience.

In addition, in the second state, at least part of the virtual keyboard is invisible in the first display area, which can reduce the impact on the display effect of the display interface of the first object in the first display area while inputting.

Figure 6:
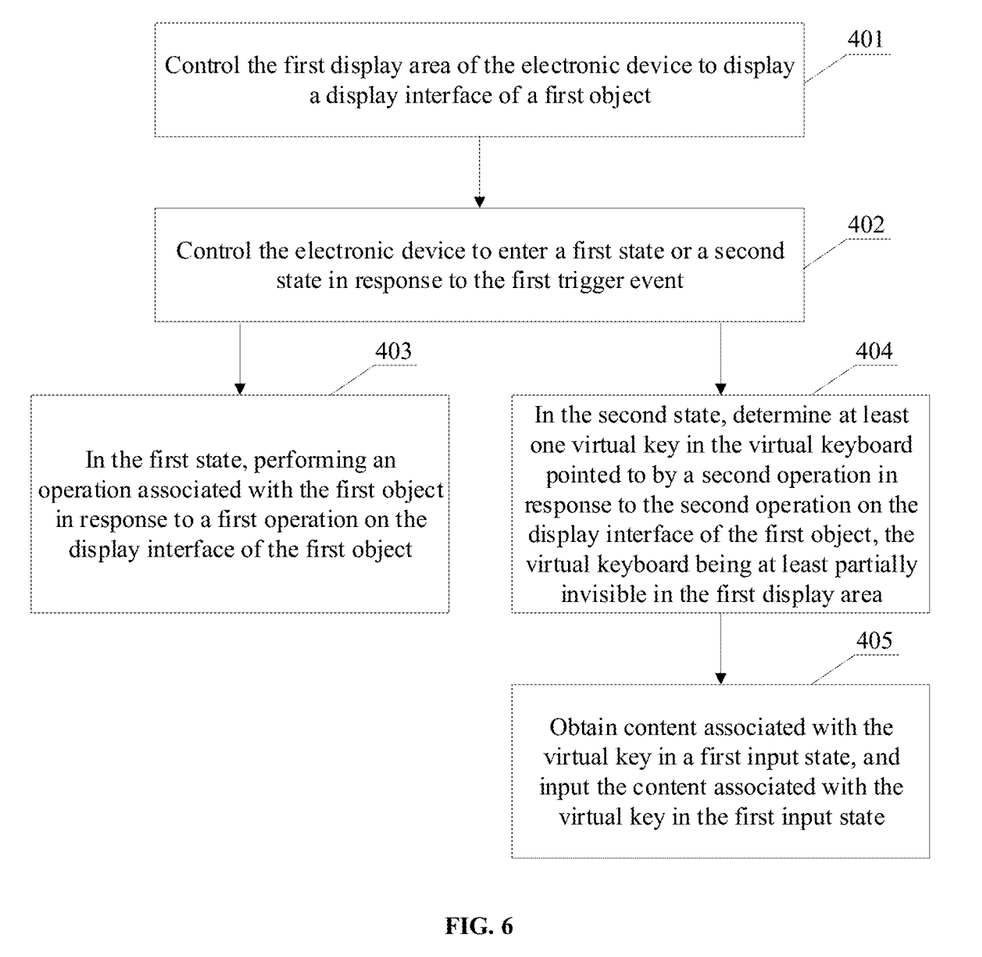
FIG. 6 is a flowchart of the control method according to an embodiment of the present disclosure.

FIG. 6 is a flowchart of the control method according to an embodiment of the present disclosure. This embodiment is mainly a refinement of the control method described above. The method will be described in detail below.

401, controlling the first display area of the electronic device to display a display interface of a first object.

402, controlling the electronic device to enter a first state or a second state in response to the first trigger event.

403, in the first state, performing an operation associated with the first object in response to a first operation on the display interface of the first object.

404, in the second state, determining at least one virtual key in the virtual keyboard pointed to by a second operation in response to the second operation on the display interface of the first object, the virtual keyboard being at least partially invisible in the first display area.

For details of the processes of 401 to 404, reference can be made to the relevant descriptions of the processes of 301 to 304, which will not be repeated here.

405, obtaining content associated with the virtual key in a first input state, and inputting the content associated with the virtual key in the first input state.

In some embodiments, the first input state may be determined by responding to the second operation on the display interface of the first object. The first input state may include, but is not limited to, an English uppercase input state, an English lowercase input state, or a Chinese input state.

The process at 405 can be a specific implementation of the process at 305.

Consistent with the present disclosure, in the second state, in response to a second operation input on the display interface of the first object, at least one virtual key in the virtual keyboard pointed to by the second operation can be determined, content associated with the virtual key in the first input state can be obtained, and the content associated with the virtual key in the first input state can be input. In this way, the content associated with the virtual in a specific input state can be input without interface switching, which improves the input convenience of the electronic device, thereby improving the user interaction experience.

Figure 7:
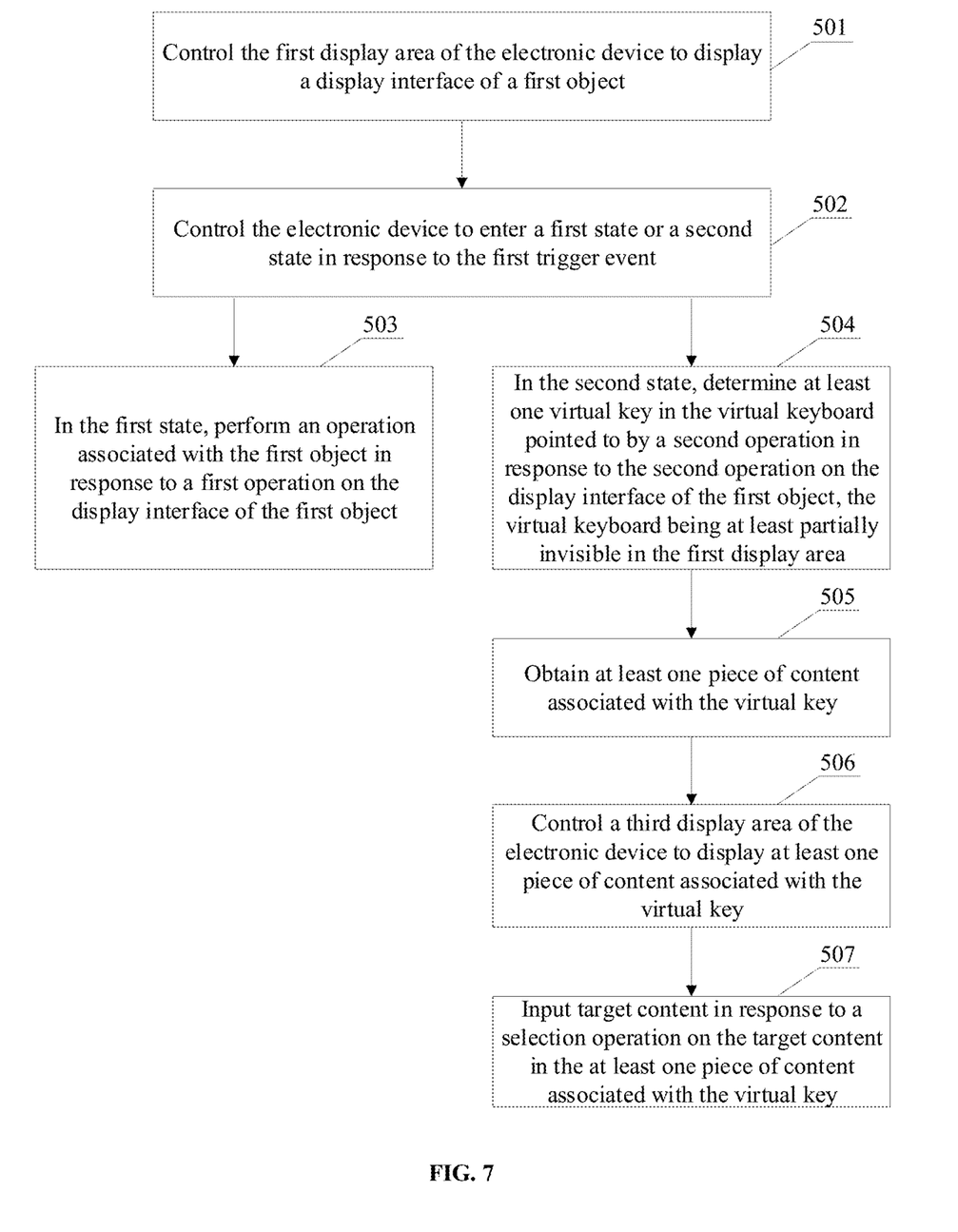
FIG. 7 is a flowchart of the control method according to an embodiment of the present disclosure.

FIG. 7 is a flowchart of the control method according to an embodiment of the present disclosure. This embodiment is mainly a refinement of the control method described above. The method will be described in detail below.

501, controlling the first display area of the electronic device to display a display interface of a first object.

502, controlling the electronic device to enter a first state or a second state in response to the first trigger event.

503, in the first state, performing an operation associated with the first object in response to a first operation on the display interface of the first object.

504, in the second state, determining at least one virtual key in the virtual keyboard pointed to by a second operation in response to the second operation on the display interface of the first object, the virtual keyboard being at least partially invisible in the first display area.

For details of the processes of 501 to 504, reference can be made to the relevant descriptions of the processes of 301 to 304, which will not be repeated here.

505, obtaining at least one piece of content associated with the virtual key.

In some embodiments, the virtual key may be associated with at least one piece of content. For example, the virtual key "O" may be associated with the character "I", "O", and "P".

506, controlling a third display area of the electronic device to display at least one piece of content associated with the virtual key.

In some embodiments, the third display area may be the same as the first display area, or the third display area may be a display area different from the first display area.

507, inputting target content in response to a selection operation on the target content in the at least one piece of content associated with the virtual key.

The processes of 505 to 507 can be a specific implementation of the process at 305.

Consistent with the present disclosure, when the third display area of the electronic device displays at least one piece of content associated with the virtual key, a selection operation can be performed on the displayed at least one piece of content associated with the virtual key. The electronic device can input the target content in response to the selection operation of the target content in the at least one piece of content associated with the virtual key, thereby ensuring the accuracy of the input. For example, when the characters "I", "O", and "P" associated with the virtual key "O" are displayed in the third display area, in response to a selection operation of "I" in the characters "I", "O", and "P" associated with the virtual key "O", the electronic device may input the character "I" to prevent the user from inputting the character "O" due to mis-operation of the virtual key "O" to ensure the input accuracy.

Figure 8:
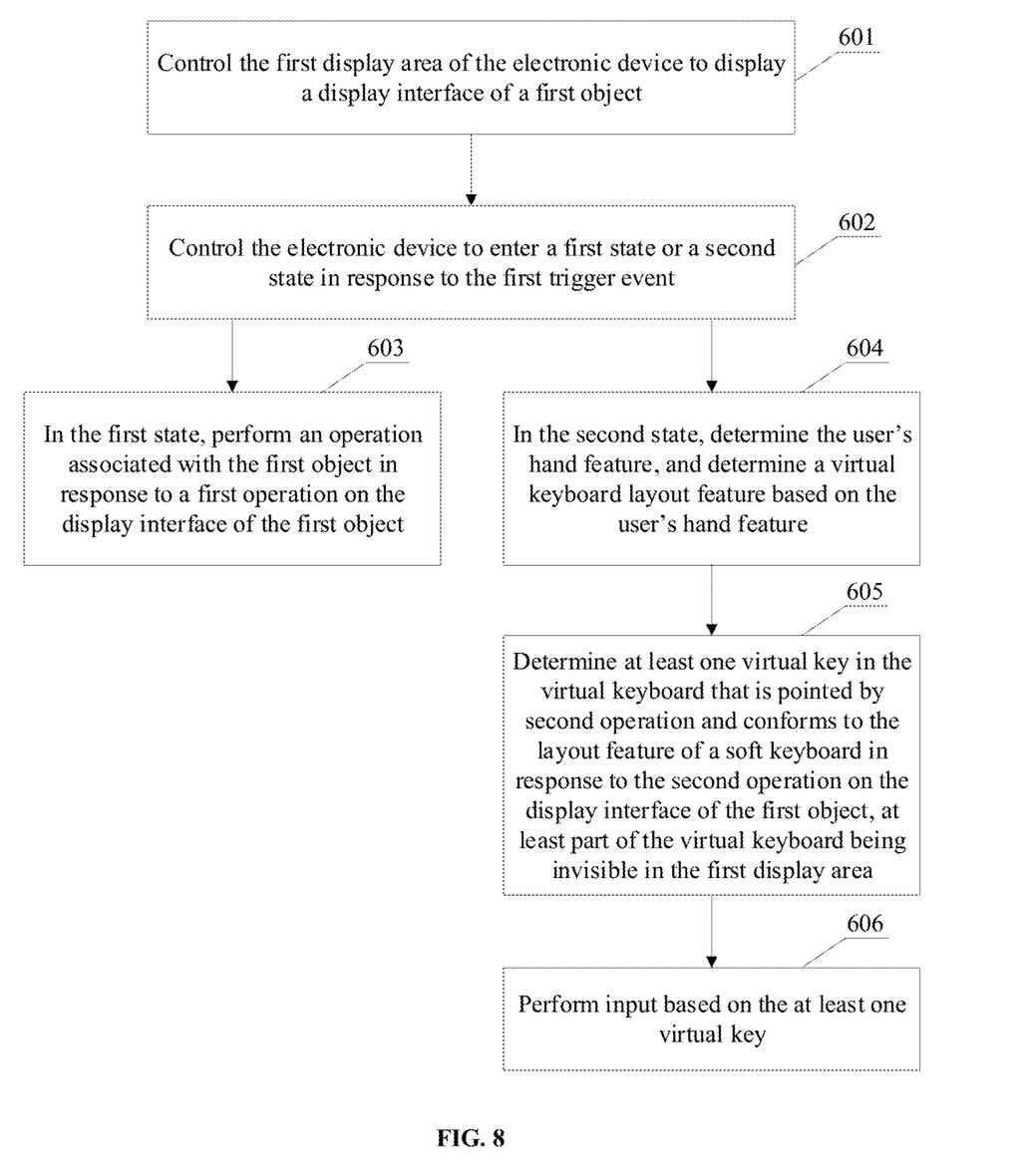
FIG. 8 is a flowchart of the control method according to an embodiment of the present disclosure.

FIG. 8 is a flowchart of the control method according to an embodiment of the present disclosure. This embodiment is mainly a refinement of the control method described above. The method will be described in detail below.

601, controlling the first display area of the electronic device to display a display interface of a first object.

602, controlling the electronic device to enter a first state or a second state in response to the first trigger event.

603, in the first state, performing an operation associated with the first object in response to a first operation on the display interface of the first object.

For details of the processes of 601 to 604, reference can be made to the relevant descriptions of the processes of 301 to 303, which will not be repeated here.

604, in the second state, determining the user's hand feature, and determining a virtual keyboard layout feature based on the user's hand feature.

In some embodiments, the user's hand feature may include, but is not limited to, a first hand feature indicating the size of the user's hand, and/or a first associated feature indicating the position of the user's hand on the screen.

In some embodiments, the virtual keyboard layout feature may be determined based on the first hand feature indicating the size of the user's hand, and/or the first associated feature indicating the position of the user's hand on the screen.

605, determining at least one virtual key in the virtual keyboard that is pointed by second operation and conforms to the layout feature of a soft keyboard in response to the second operation on the display interface of the first object, at least part of the virtual keyboard being invisible in the first display area.

The process at 605 can be a specific implementation of the process at 304.

606, performing input based on the at least one virtual key.

In some embodiments, performing input based on the at least one virtual key may include the following processes.

6061, determining a first hot zone position corresponding to the virtual key in a soft keyboard hot zone layout, the soft keyboard hot zone layout being obtained by using a machine learning model to learn the user's input habits.

6062, triggering the soft keyboard hot zone corresponding to the position of the first hot zone to input the content corresponding to the soft keyboard hot zone.

In some embodiments, a machine learning model may be used to learn the user's input habits to obtain the soft keyboard hot zone layout. Subsequently, the first hot zone corresponding to the virtual key in the soft keyboard hot zone layout may be determined, ad the soft keyboard hot zone corresponding to the first hot zone position may be triggered to input the content corresponding to the soft keyboard hot zone, which can improve the input accuracy.

For details of the process at 606, reference can be made to the relevant description of the process at 305, which will not be repeated here.

Consistent with the present disclosure, in the second state, the user's hand feature can be determined, then the virtual keyboard layout feature can be determined based on the user's hand feature. The virtual keyboard layout feature can be adapted to the user's hand feature. Further, at least one virtual key can be determined in the virtual keyboard that conforms to the soft keyboard layout feature pointed to by the second operation, and input can be performed based on the virtual key to improve the input accuracy.

Figure 9:
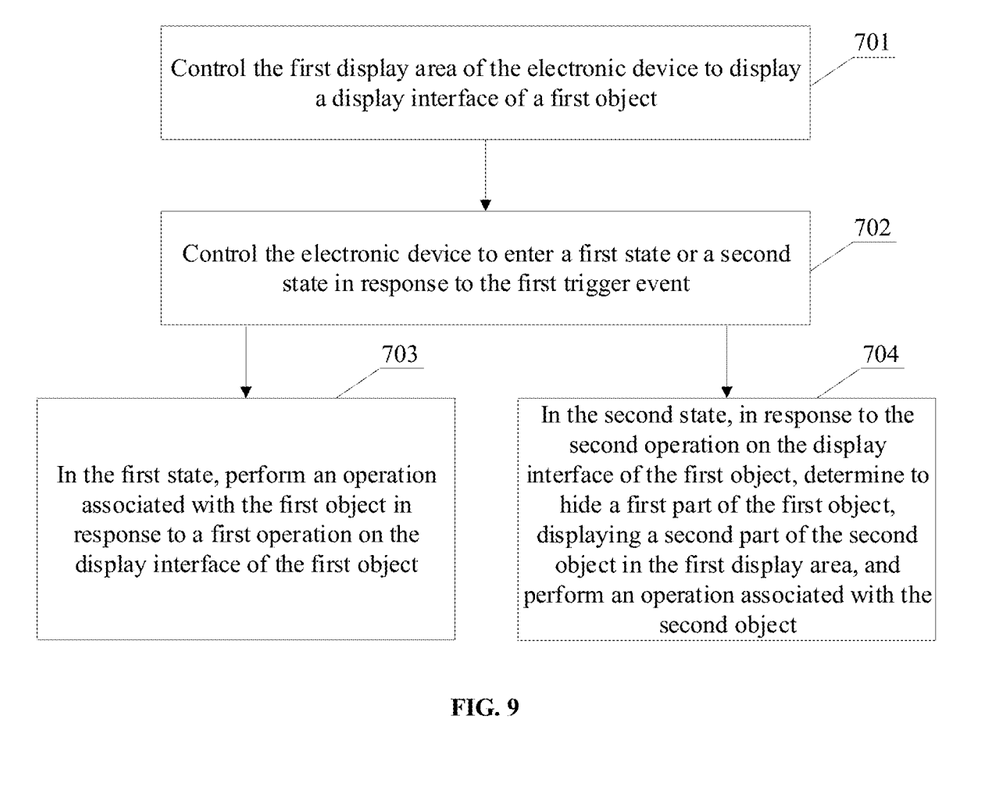
FIG. 9 is a flowchart of the control method according to an embodiment of the present disclosure.

FIG. 9 is a flowchart of the control method according to an embodiment of the present disclosure. This embodiment is mainly a refinement of the control method described above. The method will be described in detail below.

701, controlling the first display area of the electronic device to display a display interface of a first object.

702, controlling the electronic device to enter a first state or a second state in response to the first trigger event.

703, in the first state, performing an operation associated with the first object in response to a first operation on the display interface of the first object.

704, in the second state, in response to the second operation on the display interface of the first object, determining to hide a first part of the second object, displaying a second part of the second object in the first display area, and performing an operation associated with the second object.

In some embodiments, in response to the second operation on the display interface of the first object, determining to hide a first part of the second object, and displaying a second part of the second object in the first display area may include the following processes.

7041, obtaining information of the first object in response to a second operation on the display interface of the first object.

7042, determining whether to hide the second object based on the information of the first object; and if it is determined that no operation or input is required for the first object based on the information of the first object, determining that the first part of the second object is hidden and performing the process at 7043.

7043, displaying the second part of the second object in the first display area.

The display manner of the second part of the second object is not limited in the present disclosure. The display manner of the second part of the second object may include setting the display brightness of the second part of the second object to be different from the display brightness of the first display area, and displaying the second part of the second object in the first display area based on the set display brightness of the second part of the second object.

Figure 10:
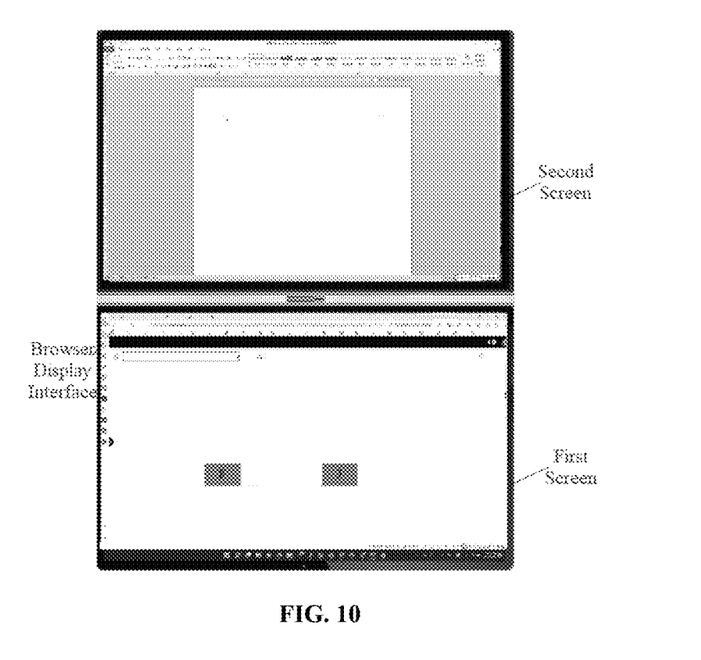
FIG. 10 is a schematic diagram of an implementation scenario of the control method according to an embodiment of the present disclosure.

In some embodiments, when the second object is the virtual keyboard, the part of the virtual keyboard other than the positioning keys may be determined to be hidden based on the information of the first object, and then the positioning keys of the virtual keyboard may be displayed in the first display area. As shown in FIG. 10, when the first object is a browser, the positioning keys "F" and "J" are displayed in the first display area of the first screen. By displaying the second part of the second object in the first display area, the convenience of performing operations associated with the second object can be improved.

An embodiment of the present disclosure further provides a control device. The control device will be described below. The control device described below and the control method described above can be referred to each other correspondingly.

Figure 11:
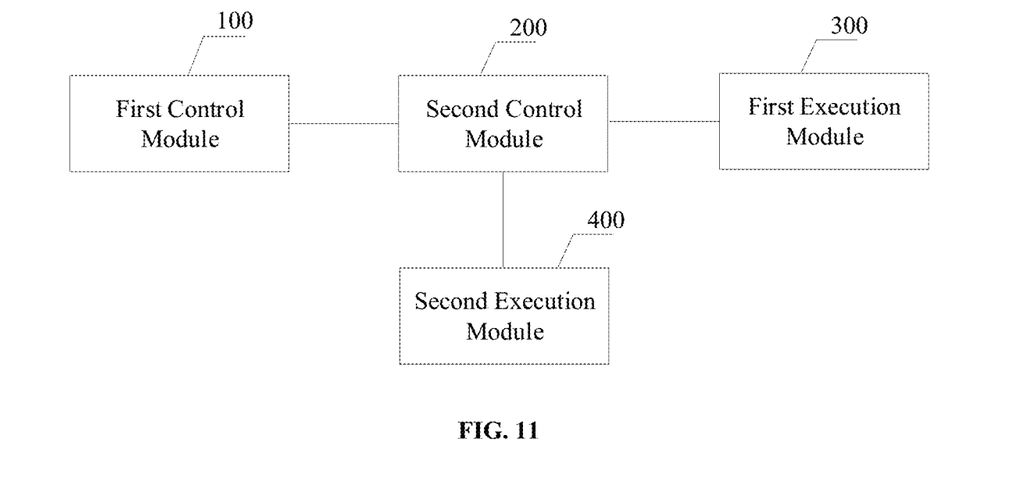
FIG. 11 is a schematic structural diagram of a control device according to an embodiment of the present disclosure.

FIG. 11 is a schematic structural diagram of a control device according to an embodiment of the present disclosure. As shown in FIG. 11, the control device includes a first control module 100, a second control module 200, a first execution module 300, and a second execution module 400.

In some embodiments, the first control module 100 may be configured to control the first display area of the electronic device to display the display interface of the first object.

In some embodiments, the second control module 200 may be configured to control the electronic device to enter the first state or the second state in response to the first trigger event.

In some embodiments, the first execution module 300 may be configured to perform an operation associated with the first object in response to a first operation on the display interface of the first object in the first state.

In some embodiments, the second execution module 400 may be configured to perform an operation associated with the second object in response to a second operation on the display interface of the first object in the second state, at least part of the second object being invisible in the first display area.

In some embodiments, the second object may be operated in the first virtual area, and the first virtual area may at least overlap with the display area of the first object.

In some embodiments, the second execution module 400 may be further configured to determine to hide the first part of the second object and display the second part of the second object in the first display area before performing the operation associated with the second object.

In some embodiments, the second execution module 400 may be configured to, in the second state, in response to the gesture input to the display interface of the first object, perform an operation associated with the gesture on the second object associated with the gesture, the second object associated with the gesture being at least partially invisible in the first display area.

In some embodiments, the second execution module 400 may be configured to, in the second state, in response to the second operation on the display interface of the first object, determine at least one virtual key in the virtual keyboard pointed to by the second operation, at least part of the virtual keyboard being invisible in the first display area; and perform input based on the at least one virtual key.

In some embodiments, the second execution module 400 may be configured to perform input in the second display area of the electronic device based on the at least one virtual key.

In some embodiments, the second execution module 400 may be configured to obtain the content associated with the virtual key in the first input state, and enter the content associated with the virtual key in the first input state; or, obtain at least one piece of content associated with the virtual key, control the third display area of the electronic device to display the at least one piece of content associated with the virtual key, and input the target content in response to a selection operation on the target content in the at least one piece of content associated with the virtual key.

In some embodiments, the control device may further include a first determining module. The first determining module may be configured to determine the user's hand feature, and determine the virtual keyboard layout feature based on the user's hand feature. Correspondingly, the second execution module 400 may be configured to determine at least one virtual key in the virtual keyboard that is pointed to by the second operation, and conforms to the layout feature of the soft keyboard Corresponding to the foregoing method embodiments, an embodiment of the present disclosure further provides an electronic device for applying the control method.

Figure 12:
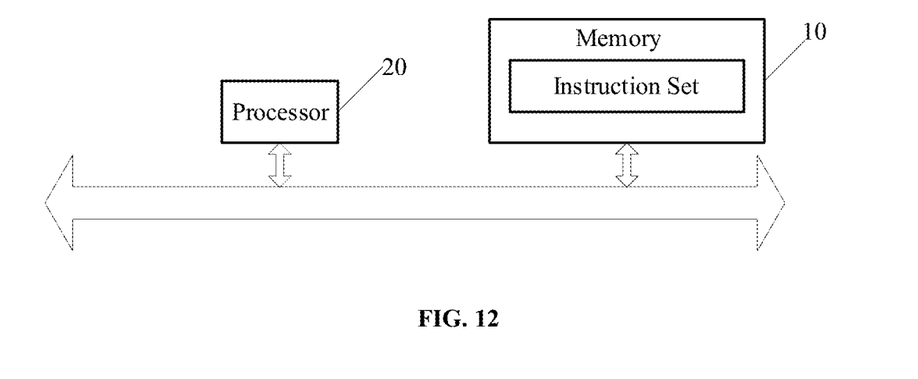
FIG. 12 is a schematic structural diagram of an electronic device according to an embodiment of the present disclosure.

FIG. 12 is a schematic structural diagram of an electronic device according to an embodiment of the present disclosure. As shown in FIG. 12, the electronic device includes a memory 10 and a processor 20. The memory 10 can be used to store at least one set of instructions, and the processor 20 can be configured to call and execute the instruction set in the memory 10, and execute the control method described in any one of the foregoing method embodiments by executing the instruction set.

Corresponding to the foregoing method embodiments, an embodiment of the present disclosure further provides a storage medium.

In some embodiments, the storage medium can store a computer program that can implement the control method described in any one of the foregoing embodiments. The computer program can be executed by a processor to implement the control method described in any one of the foregoing embodiments.

It should be noted that the various embodiments in the present specification are described in a progressive manner, and each embodiment focuses on differences from other embodiments, and the same similar parts between the various embodiments can be referred to each other.

It should be noted that the relationship terms used in the text of this application, such as first and second, are only for distinguishing an object or operation from another object or operation, but not for defining or implying any practical relation or order between the object or operation. The terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment.

For the convenience of description, when describing the above system or device, the function is divided into various modules or units and described separately. Of course, when implementing the embodiments of the present disclosure, the function of each unit may be implemented in the same or multiple software and/or hardware.

It can be appreciated by those skilled in the art from the description of the above embodiments that the present disclosure can be implemented by software in combination of necessary general hardware platform or by hardware, but the former is preferred in many cases. Based on this understanding, the solution of the present disclosure or the part making contribution to the prior art can be substantially embodied in software product. This computer software product can be stored in a storage medium, such as ROM/RAM, magnetic disk, optical disk and the like, and comprises several instructions for causing a computer device (which can be a personal computer, a server or a network device) to perform the method described in the respective embodiments, or some parts thereof, according to the present disclosure.

Based on the description of the foregoing implementation manners, those skilled in the art may clearly understand that the present disclosure may be implemented in a manner of software plus a general hardware platform. Based on this understanding, part or all of the technical solutions of the disclosure may be embodied in the form of computer program stored in a non-transitory computer-readable storage medium, which can be sold or used as a standalone product. The computer program can include instructions that enable a computer (such as a personal computer, a server, or a network device) to perform part or all of a method consistent with the disclosure. The storage medium can be any medium that can store program codes, for example, a read-only memory (ROM), a random-access memory (RAM), a magnetic disk, a compact disc read-only memory (CD-ROM), etc.

The above embodiments are only exemplary embodiments of the present disclosure, and are not intended to limit the present disclosure. The protection scope of the present disclosure is defined by the claims. Various modifications or equivalent substitutions may be made to the present disclosure by those skilled in the art within the essence and the protection scope of the present disclosure, and such modifications or equivalent substitutions should be regarded as falling into the protection scope of the present disclosure as well.

What is claimed is:

1. A control method comprising:
controlling a first display area of an electronic device to display a display interface of a first object, the electronic device including a first screen and a second screen, the first display area being located in the first screen, and a second display area being located in the second screen;
controlling the electronic device to enter a first state or a second state in response to a first trigger event;
in the first state, performing an operation associated with the first object in response to a first operation on the display interface of the first object;
in the second state, performing an operation associated with a second object in response to a second operation on the display interface of the first object, including:
hiding, based on information of the first object, a first part of the second object in a background of the first display area; and
displaying a second part of the second object in the first display area, a display brightness of the second part being set to be different from a display brightness of the first object in the first display area, wherein the second object is a virtual keyboard, the second part of the second object includes two positioning keys of the virtual keyboard for aiding left and right hands, respectively, to position keys on the virtual keyboard, and the first part is a part of the virtual keyboard other than the two positioning keys.

2. The method of claim 1, wherein, in the second state, performing the operation associated with the second object in response to the second operation on the display interface of the first object includes:
in the second state, performing an operation associated with a gesture on the second object associated with the gesture in response to a gesture input to the display interface of the first object, the second object associated with the gesture being partially invisible in the first display area.

3. The method of claim 1, wherein, in the second state, performing the operation associated with the second object in response to the second operation on the display interface of the first object includes:
in the second state, determining at least one virtual key in the virtual keyboard pointed to by the second operation according to a pre-established relationship in response to second operation on the display interface of the first object, the virtual keyboard being partially invisible in the first display area; and
performing input based on the at least one virtual key.

4. The method of claim 3, wherein performing input based on the at least one virtual key includes:
performing input in a second display area of the electronic device based on the at least one virtual key.

5. The method of claim 3, wherein performing input based on the at least one virtual key includes:
obtaining content associated with the virtual key in a first input state, and inputting the content associated with the virtual key in the first input state; or,
obtaining at least one piece of content associated with the virtual key;
displaying the at least one piece of content associated with the virtual key; and
inputting target content in response to a selection operation of the target content in the at least one piece of content associated with the virtual key.

6. The method of claim 3 further comprises:
determining a user's hand feature; and
determining a virtual keyboard layout feature based on the user's hand feature, wherein:
determining the at least one virtual key in the virtual keyboard pointed to by the second operation includes:
determining at least one virtual key in the virtual keyboard that is pointed to by the second operation and conforms to the layout feature of a soft keyboard.

7. The method of claim 1, wherein:
the second object is configured to be operated in a first virtual area, the first virtual area being at least overlapping with a display area of the first object.

8. The method of claim 1, wherein the two positioning keys are "F" and "J" keys.

9. A control device comprising:
a first control module configured to control a first display area of an electronic device to display a display interface of a first object, the electronic device including a first screen and a second screen, the first display area being located in the first screen, and a second display area being located in the second screen, and;
a second control module configured to control the electronic device to enter a first state or a second state in response to a first trigger event;
a first execution module configured to perform an operation associated with the first object in response to a first operation on the display interface of the first object in the first state;
a second execution module configured to perform an operation associated with a second object in response to a second operation on the display interface of the first object, including:
hiding, based on information of the first object, a first part of the second object in a background of the first display area; and
displaying a second part of the second object in the first display area, a display brightness of the second part being set to be different from a display brightness of the first object in the first display area, wherein the second object is a virtual keyboard, the second part of the second object includes two positioning keys of the virtual keyboard for aiding left and right hands, respectively, to position keys on the virtual keyboard, and the first part is a part of the virtual keyboard other than the two positioning keys.

10. The control device of claim 9, wherein the second execution module is further configured to:
in the second state, perform an operation associated with a gesture on the second object associated with the gesture in response to a gesture input to the display interface of the first object, the second object associated with the gesture being partially invisible in the first display area.

11. The control device of claim 9, wherein the second execution module is further configured to:
in the second state, determine at least one virtual key in the virtual keyboard pointed to by the second operation according to a pre-established relationship in response to second operation on the display interface of the first object, the virtual keyboard being partially invisible in the first display area; and
perform input based on the at least one virtual key.

12. The control device of claim 11, wherein the second execution module is further configured to:
perform input in a second display area of the electronic device based on the at least one virtual key.

13. The control device of claim 11, wherein the second execution module is further configured to:
obtain content associated with the virtual key in a first input state, and input the content associated with the virtual key in the first input state; or,
obtain at least one piece of content associated with the virtual key;
display the at least one piece of content associated with the virtual key; and input target content in response to a selection operation of the target content in the at least one piece of content associated with the virtual key.

14. The control device of claim 11 further comprises:
a first determining module, the first determining module being configured to determine a user's hand feature, and determine a virtual keyboard layout feature based on the user's hand feature, wherein:
the second execution module is further configured to:
determine at least one virtual key in the virtual keyboard that is pointed to by the second operation and conforms to the layout feature of a soft keyboard.

15. The control device of claim 9, wherein:
the second object is configured to be operated in a first virtual area, the first virtual area being at least overlapping with a display area of the first object.

16. An electronic device comprising:
a processor; and
a memory storing program instructions that, when being executed by the processor, cause the processor to:
control a first display area of the electronic device to display a display interface of a first object, the electronic device including a first screen and a second screen, the first display area being located in the first screen, and a second display area being located in the second screen;
control the electronic device to enter a first state or a second state in response to a first trigger event;
in the first state, perform an operation associated with the first object in response to a first operation on the display interface of the first object; and
in the second state, perform an operation associated with the second object in response to a second operation on the display interface of the first object, including:
hiding, based on information of the first object, a first part of the second object in a background of the first display area; and
displaying a second part of the second object in the first display area, a display brightness of the second part being set to be different from a display brightness of the first object in the first display area, wherein the second object is a virtual keyboard, the second part of the second object includes two positioning keys of the virtual keyboard for aiding left and right hands, respectively, to position keys on the virtual keyboard, and the first part is a part of the virtual keyboard other than the two positioning keys.

17. The electronic device of claim 16, wherein the program instructions further cause the processor to:
in the second state, perform an operation associated with a gesture on the second object associated with the gesture in response to a gesture input to the display interface of the first object, the second object associated with the gesture being partially invisible in the first display area.

18. The electronic device of claim 16, wherein the program instructions further cause the processor to:
in the second state, determine at least one virtual key in the virtual keyboard pointed to by the second operation according to a pre-established relationship in response to second operation on the display interface of the first object, the virtual keyboard being partially invisible in the first display area; and
perform input based on the at least one virtual key.

19. The electronic device of claim 18, wherein the program instructions further cause the processor to:
  perform input in a second display area of the electronic device based on the at least one virtual key.

\* \* \* \* \*